(12) United States Patent
Pan

(10) Patent No.: US 8,948,602 B2
(45) Date of Patent: Feb. 3, 2015

(54) INFORMATION SYSTEM INCLUDING A CARD AND A CARD READER CONNECTED OPTICALLY

(76) Inventor: Yang Pan, Singapore (SG)

( * ) Notice: Subject to any disclaimer, the term of this patent is extended or adjusted under 35 U.S.C. 154(b) by 290 days.

(21) Appl. No.: 13/549,522

(22) Filed: Jul. 16, 2012

(65) Prior Publication Data

US 2014/0016945 A1   Jan. 16, 2014

(51) Int. Cl.
   *H04B 10/00*   (2013.01)

(52) U.S. Cl.
   USPC ........... 398/130; 398/128; 398/118; 398/172; 398/140; 398/135; 235/380; 235/439; 235/487; 235/492

(58) Field of Classification Search
   CPC ............. H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/40; H04B 10/43
   USPC ......... 398/171, 172, 118, 119, 120, 124, 128, 398/129, 130, 131, 135, 136, 138, 139, 398/140; 235/454, 491, 492, 493, 449, 379, 235/380, 439, 487
   See application file for complete search history.

(56) References Cited

U.S. PATENT DOCUMENTS

| | | | |
|---|---|---|---|
| 4,843,226 A | 6/1989 | Kato et al. | |
| 5,196,682 A * | 3/1993 | Englehardt | 235/454 |
| 5,299,046 A * | 3/1994 | Spaeth et al. | 398/135 |
| 5,528,409 A * | 6/1996 | Cucci et al. | 398/15 |
| 6,471,130 B2 | 10/2002 | Iwasaki | |
| 6,786,407 B1 | 9/2004 | Takasugi | |
| 6,814,285 B1 | 11/2004 | Stroup | |
| 7,920,940 B2 | 4/2011 | Bates et al. | |
| 2006/0250932 A1 | 11/2006 | Van Houten | |
| 2007/0255901 A1 | 11/2007 | Maeda et al. | |
| 2010/0121692 A1 | 5/2010 | Top | |
| 2011/0024507 A1 | 2/2011 | Tanaka et al. | |

* cited by examiner

*Primary Examiner* — Hanh Phan

(57) ABSTRACT

An information system comprises a card and a card reader. The card and the card reader can be coupled by an optical communication module and an optical power transfer module. Operations of the card can be powered by the power transferred from the card reader through the optical power transfer module. In one embodiment, the card and the card reader comprise multiple cells of transmitter/receiver that transmit and receive data in a parallel manner

4 Claims, 3 Drawing Sheets

INFORMATION SYSTEM INCLUDING A CARD AND A CARD READER CONNECTED OPTICALLY

CROSS-REFERENCE TO RELATED APPLICATIONS

Not applicable.

BACKGROUND

1. Field of the Invention

This invention relates generally to information system. More specifically, the invention describes an information system based on a card and a card reader for storing and accessing data in the card.

2. Description of Prior Art

The use of financial transaction cards such as, for example, credit cards has become common place in virtually every aspect of consumerism. It is not un-usual that a person carries multiple cards in his or her wallet. It would be desirable to find more applications for the cards. The use of the cards for mass data storage has not been fully explored.

SUMMARY OF THE INVENTION

It is an object of the present invention to provide an information system based on a card and a card reader that enables data stored in the card to be accessed at high speed with the use of an optical communication module and an optical power transfer module.

An exemplary information system comprises a card and a card reader. The card and the card reader may be coupled through the optical communication module and the optical power transfer module. The optical communication module further comprises a transmitter and a receiver. In an exemplary implementation, the transmitter is a Light Emitting Diode (LED) and the receiver is a photodiode. The power transfer module includes a light source in the card reader that emits a light beam. An optical energy receiver in the card receives the light beam and converts the received optical energy into electrical power. The card without an on card power supply consumes the electrical power for its operations.

In another embodiment, the card and card reader include multiple cells. Each of the cells includes a transmitter/receiver. Data can be transmitted and be received in a parallel manner.

BRIEF DESCRIPTION OF THE DRAWINGS

For a more complete understanding of the present invention and its various embodiments, and the advantages thereof, reference is now made to the following description taken in conjunction with the accompanying drawings, in which.

DETAILED DESCRIPTION

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

Figure 1:
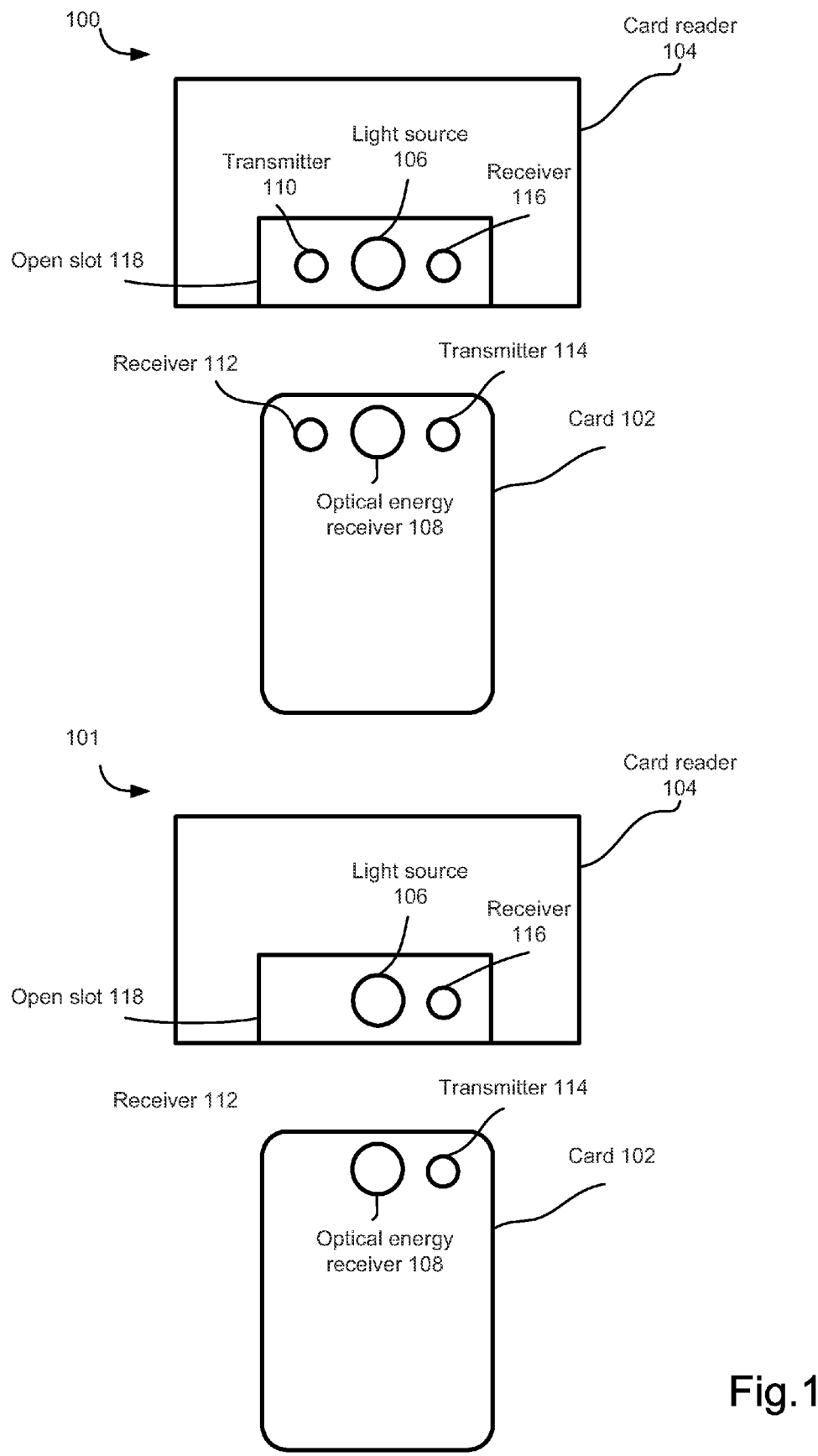
FIG. 1 is a schematic diagram illustrating an exemplary information system including a card and a card reader connected optically.

FIG. 1 is a schematic diagram illustrating an exemplary information system including a card and a card reader connected optically. Exemplary information system 100 includes a card 102 and a card reader 104. Card 102 may be a financial transaction card such as, for example, a credit card or a charging card. Card 102 may also be an identity card. Card 102 may be a dedicated card for storing data. Card reader 104 may be a dedicated card reader. Card reader 104 may be a part of an electronic device, such as, for example, a part of mobile computing and communication device (i.e. a mobile phone, a tablet computer, a laptop computer and a handheld media player). Card reader 104 further includes a light source 106. Light source 106 may be a laser. Light source 106 may be a LED or multiple LED's. Light source 106 may also be any light emitting device. An optical energy receiver 108 receives a light beam emitted from light source 106 and converts received optical energy into electrical power. Card 102 does not have a power supply on the card. Electrical power as an output of optical energy receiver 108 is employed to provide power for the operations of card 102. The operations include but are not limited to receiving data from card reader 104, storing the received data in a storage unit of the card and transmitting data stored in card 102 to card reader 104.

In one embodiment, data may be transmitted from a transmitter 110 in card reader 104 to a receiver 112 in card 102. Data may also be transmitted from a transmitter 114 in card 102 to a receiver 116 in card reader 104. In one implementation, transmitters are LED's and receives are photodiodes. The transmitters can be any light source from which an emitted light beam can be modulated to carry data. The receivers can be any photo-detectors that include photo-sensitive passive and active devices.

Card reader 104 includes an open slot 118 for receiving card 102. Alignments between light source 106 and optical energy receiver 108, between transmitter 110 and receiver 112 and between transmitter 114 and receiver 116 are required.

In another embodiment as illustrated in exemplary system 101, light source 106 and optical energy receiver 108 are employed to transmit data from card reader 104 to card 102. The light beam emitted from light source 106 is modulated to carry data. For such an implementation, signal detection and decoding circuit (not shown in FIG. 1) is included in card 102 for receiving the data carried by the light beam.

Figure 2:
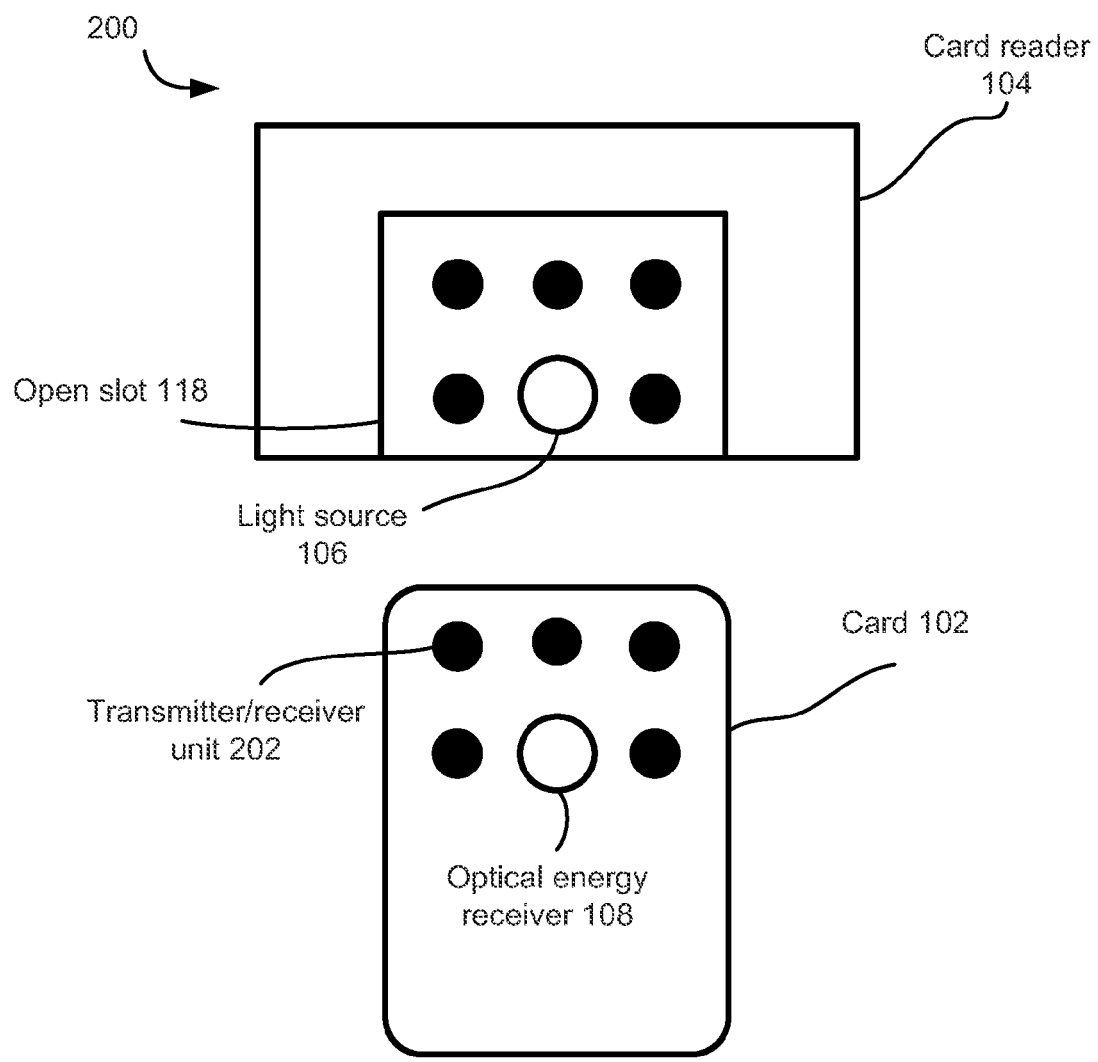
FIG. 2 is a schematic diagram illustrating an exemplary information system including multiple cells for transmitting and for receiving data in a parallel manner.

FIG. 2 is a schematic diagram illustrating an exemplary information system 200 including multiple cells for transmitting and receiving data in a parallel manner Exemplary system 200 includes a light source 106 in card reader 104 and an optical energy receiver 108 in card 102. Both card 102 and card reader 104 include multiple cells as illustrated as black circles in FIG. 2. Each of the cells is a transmitter/receiver unit 202. Transmitter/receiver unit 202 can transmit or receive a light beam. Transmitter/receiver unit 202 may include a LED for emitting a light beam and a photodiode for receiving a light beam. The cells in card 102 and in card reader 104 are aligned when card 102 is inserted into card reader 104 through open slot 118.

After optical energy receiver 108 in card 102 receives the optical energy from light source 106 in card reader 104, card 102 is powered by the electrical power converted by optical energy receiver 108. Each of units 202 in card 102 may emit a light beam. The emitted light beams may be received by units 202 in card reader 104. Further, each of units 202 in card reader 104 may emit a light beam. The emitted light beams may be received by the units 202 in card 102. The cells may transmit and receive data in a parallel manner Each of units 202 may be connected to a solid state memory device such as, for example, a flash memory device to retrieve or to store data in the memory devices. In an exemplary implementation, card 102 may include 64 cells to receive 64 bits data concurrently from 64 cells in card reader 104. The present invention could improve data transmission speed between a card and a card reader in a very significant way using a relatively simple implementation.

Figure 3:
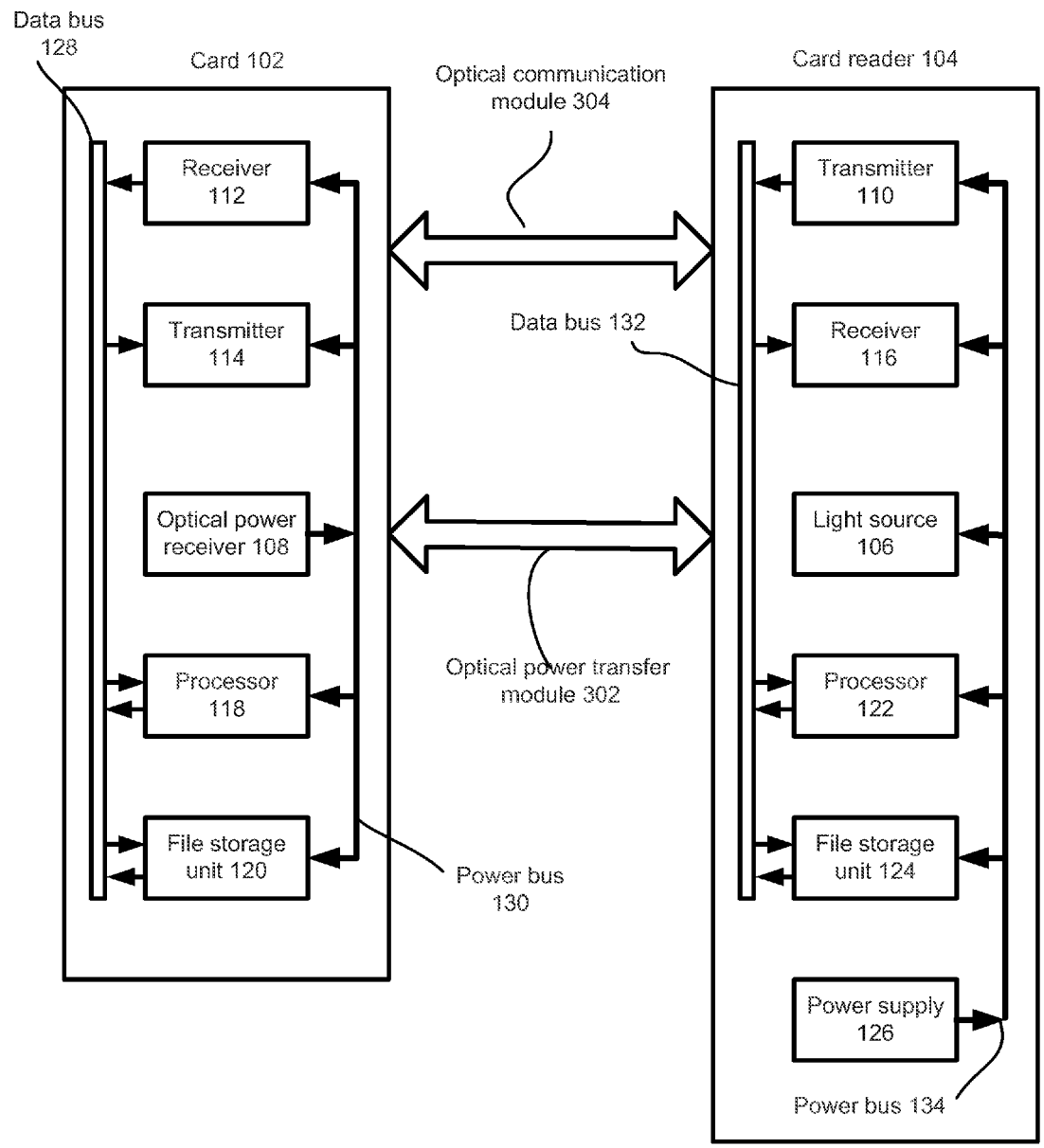
FIG. 3 is a schematic diagram illustrating exemplarily functional blocks of the card and the card reader.

FIG. 3 is a schematic diagram illustrating exemplarily functional blocks of card 102 and card reader 104. As shown in FIG. 3, card 102 and card reader 104 are coupled through an optical power transfer module 302 and an optical communication module 304. Optical power is transferred from card reader 104 to optical power receiver 108 in card 102 through optical power transfer module 302. Card 102 further comprises a receiver 112, a transmitter 114, a processor 118 and a file storage unit 120. Optical power receiver 108 provides electrical power to receiver 112, transmitter 114, processor 118 and files storage unit 120 through a power bus 130. In one operation, processor 118 fetches a data file from file storage unit 120 and transmits the data file from transmitter 114 to receiver 116 through optical communication module 304. The fetched data file is converted to a modulated light beam by transmitter 114. In another operation, processor 118 receives data from receiver 112 and stores the received data in file storage unit 120.

Card reader 104 includes a power supply 126 that provides power through power bus 134 for operations of light source 106, transmitter 110, receiver 116, processor 122 and file storage unit 124. Processor 122 controls operations of functional blocks including transmitter 110, receiver 116 and file storage unit 124 through data bus 132. In one operation, processor 122 fetches a data file from file storage unit 124. The data is sent to transmitter 110 and is converted into a modulated light beam. The modulated light beam is received by receiver 112 in card 102. In another operation, receiver 116 receives a modulated light beam from transmitter 114 in card 102. Receiver 116 decodes the data from the light beam. Processor 122 stores the received data in file storage unit 124 through data bus 132.

The invention claimed is:

1. An information system comprising:
    a. a card;
    b. a card reader;
    c. an optical communication module for transferring data between the card and the card reader, wherein said optical communication module further comprises a plurality of transmitters and a plurality of receivers in the card and in the card reader, wherein said plurality of receivers receive data from said plurality of transmitters in a predetermined parallel manner; and
    d. an optical power transfer module for transferring power from the card reader to the card for powering operations of the card when the card and the card reader are coupled.

2. The system as recited in claim 1, said card further comprises a plurality of cells, wherein each of the cells further comprises a transmitter and a receiver.

3. The system as recited in claim 1, wherein said card reader further comprises a plurality of cells, wherein each of the cells further comprises a transmitter and a receiver.

4. The system as recited in claim 1, wherein said card reader further comprises an open slot for receiving said card.

* * * * *